United States Patent
Hoffman

(10) Patent No.: US 7,171,193 B2
(45) Date of Patent: Jan. 30, 2007

(54) TELECOMMUNICATIONS INTERRUPTION AND DISCONNECTION APPARATUS AND METHODS

(75) Inventor: Lawrence Andrew Hoffman, Portland, OR (US)

(73) Assignee: The Hoffman Group LLC, Portland, OR (US)

( * ) Notice: Subject to any disclaimer, the term of this patent is extended or adjusted under 35 U.S.C. 154(b) by 378 days.

(21) Appl. No.: 10/806,490

(22) Filed: Mar. 22, 2004

(65) Prior Publication Data
US 2005/0208931 A1  Sep. 22, 2005

(51) Int. Cl.
*H04M 3/42* (2006.01)
*H04K 3/00* (2006.01)
*H04Q 7/20* (2006.01)
*H04Q 7/00* (2006.01)
*H04B 17/00* (2006.01)
*H04B 1/40* (2006.01)
*H04B 1/034* (2006.01)

(52) U.S. Cl. .......................... 455/417; 455/1; 455/76; 455/95; 455/425; 455/517; 455/67.13

(58) Field of Classification Search .. 455/556.1–556.2, 455/415–420, 3.03–3.06, 414.1, 462, 466, 455/42–47, 517, 76–77, 70–72, 79, 82, 85–86, 455/550.1, 260, 267, 264–265, 273, 275, 455/189.1, 190.1, 209, 211–213, 1, 48, 67.13, 455/67.7, 401, 95, 115.1, 423–425, 701; 327/105–107; 331/39–43; 370/265–269, 370/271, 290, 287–288; 379/69, 422, 78–83, 379/142.18, 32.05, 201.07–201.08, 211.01, 379/418, 88.19, 100.14, 142.04; 375/260, 375/279, 269–270
See application file for complete search history.

(56) References Cited

U.S. PATENT DOCUMENTS

| | | | |
|---|---|---|---|
| 4,989,246 A * | 1/1991 | Wan et al. ................... | 704/212 |
| 5,297,203 A * | 3/1994 | Rose et al. .................. | 380/270 |
| 5,744,739 A * | 4/1998 | Jenkins ........................ | 84/603 |
| 6,125,175 A | 9/2000 | Goldberg et al. | |
| 6,549,767 B1 * | 4/2003 | Kawashima ............. | 455/412.2 |
| 6,628,927 B1 | 9/2003 | Samuels | |
| 6,901,266 B2 * | 5/2005 | Henderson ................... | 455/462 |
| 2002/0071511 A1* | 6/2002 | Jo et al. ...................... | 375/376 |
| 2003/0135294 A1* | 7/2003 | Lam ............................ | 700/94 |
| 2005/0037742 A1* | 2/2005 | Patton ...................... | 455/414.1 |
| 2005/0090208 A1* | 4/2005 | Liao ........................... | 455/112 |
| 2006/0105818 A1* | 5/2006 | Andert et al. ............ | 455/569.1 |

FOREIGN PATENT DOCUMENTS

JP  2001257745 A  *  9/2001

* cited by examiner

*Primary Examiner*—Meless Zewdu
(74) *Attorney, Agent, or Firm*—Silicon Forest Patent Group; Paul J Fordenbacher, Esq.

(57) ABSTRACT

Embodiments of interruption-sound devices for producing an interruption sound signal in a telecommunications transmission signal comprising a signal generator circuit and a processor circuit, in accordance with the present invention. The interruption sound signals are input into the appropriate location of the telecommunications device such that the interruptee perceives characteristic sounds such as those encountered when a mobile phone is about to drop a call. As a result, the interruptee will place blame for call disconnection on the mobile-phone technology and not on the interruptor. The interruption-sound device is suitable for incorporated into an external interruption module, a landline phone, and a mobile phone.

1 Claim, 8 Drawing Sheets

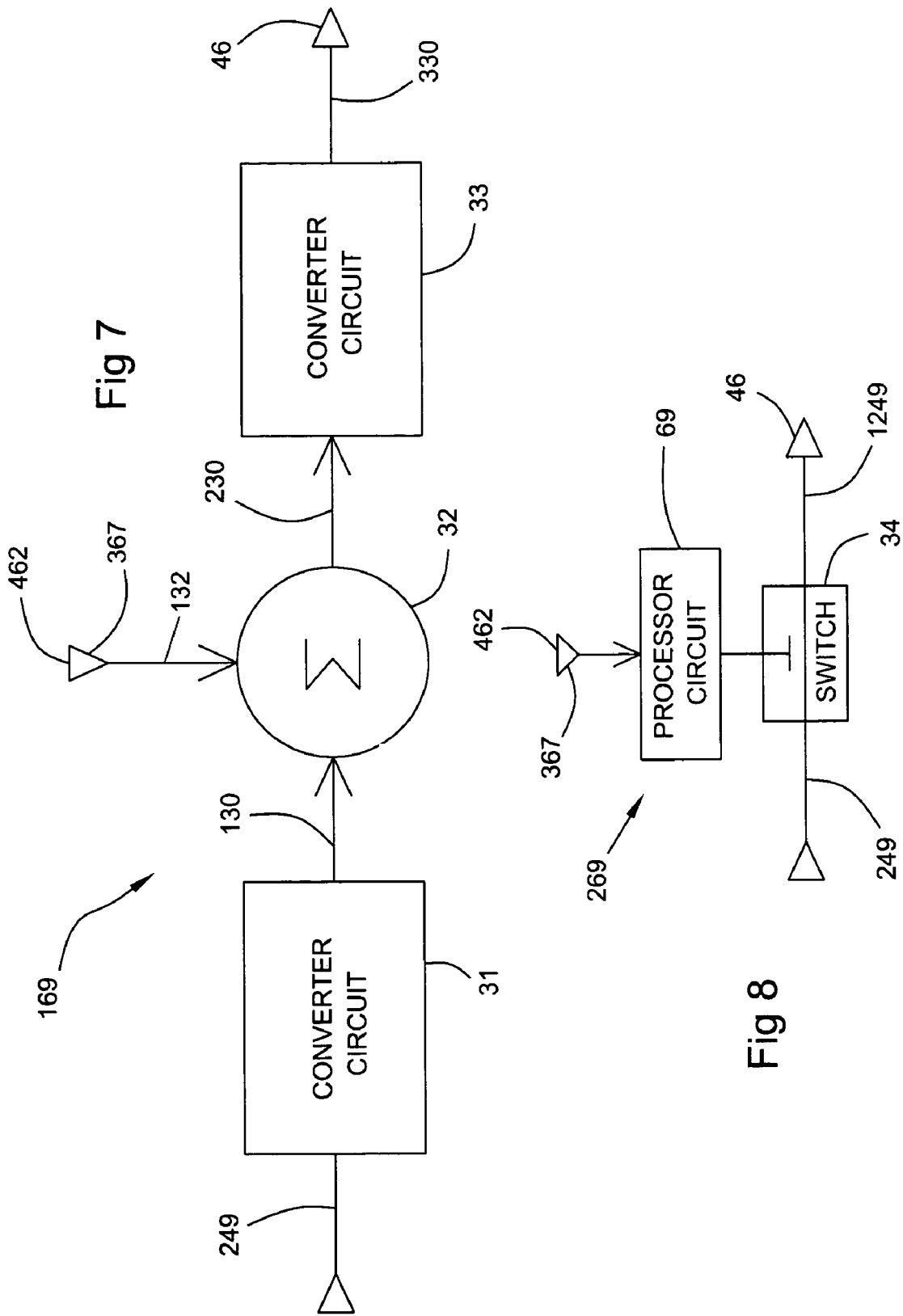

TELECOMMUNICATIONS INTERRUPTION AND DISCONNECTION APPARATUS AND METHODS

FIELD OF THE INVENTION

This invention relates to telecommunication devices, and more particularly, to components and methods associated with call interruption and disconnection.

BACKGROUND OF THE INVENTION

One focus that has been driving telecommunications technologies is improving and retaining the connection or "call" between two or more parties. Little has been done to address the age-old problem of politely and discreetly interrupting and/or disconnecting a call. Practically every party to a call, also referred to herein as a "telephone call" or "phone call", at some time or another, has had the desire, for various reasons, to interrupt and/or disconnect a call in mid-conversation. For example, disconnection might be desired in a business setting where the conversation by the other party has gone off-topic or has become protracted. When such events occur, productivity comes to a standstill and stress levels rise in the party trying to figure out a way to end the call without appearing to be impolite, offensive, or disinterested.

A call may be disconnected on a common corded phone ("phone" and "telephone" are used interchangeably herein) by simply hanging up, such as, by depressing the switchhook or cradling the handset. A call may be disconnected on a wireless phone, such as, but not limited to, a cordless or mobile telephone, by pressing the "end", "off", or similar button. In either case, call disconnection will be perceived by the other party as a hang-up and will be instinctively interpreted as aggressive, rude, and/or offensive behavior. The hang-up will be long remembered, harmful, and possibly lead to the disconnection of a desirable relationship. This would be detrimental not only for personal relationships, but also for business relationships.

For lack of a better method, a party may resort to a "socially acceptable" excuse to terminate ("terminate" and "disconnect" are used interchangeably herein) the call. In many cases, the conversation may be so controlled by the other party that even a well-formulated excuse may never have an opportunity to be voiced in the conversation, let alone lead to a polite conclusion of the call. This results in the continuation of the call to the dismay of the party desiring an end to the call.

FIG. 1 illustrates a terrestrial and astral telecommunications system (TATS) 1. The TATS 1 comprises telecommunication devices or phones 10, such as mobile phones 12 and corded phones 14, network nodes 25, transmission/receiving antennas 20, satellites 26 and satellite transmission/receiving antennas 28, all of which are capable of bring in communication with one another. Phone-to-phone telecommunication provides the means in which two or more people may communicate. The phones 10 are each coupled to a network node 25, which is a component of a network, one or more of which make up the TATS 1. One example of a TATS 1, among others, includes a landline network 5, such as a Public Switched Phone Network ("PSTN"), in combination with a mobile phone network 3.

FIG. 2 is a schematic of a corded-phone main functional-components (CFMFC) 101 of the corded phone 14 shown in FIG. 1. The corded phone 14 comprises a base unit 15 having a handset 16 and a keypad 43 for data entry. The corded phone 14 is electrically coupled to the landline network 5 with a phone cord 23 comprising wires. The handset 16 comprises a microphone 49, a speaker 48, and associated conductive paths 47. The microphone 49 detects sound pressure waves 149 originating, such as, from a user's voice, and generates an outgoing analog electrical voice signal 249. The outgoing analog electrical voice signal 249 is commonly in the form of instantaneous voltage fluctuations. The outgoing analog electrical signal 249 is transmitted along the phone cord 23 to eventually be received by another phone 10. A received analog electrical signal 248 coming from another phone 10, for example, is transmitted to the speaker 48. The speaker 48 converts the received analog electrical signal 248 into acoustic energy 148 that can be heard by the user. Many current landline networks 5 convert the analog electrical signals 248, 249 to digital formats to assist in transmission through wire, fiber optics, and high-power wireless transmission.

The corded phone 14 remains famous for providing high quality sound and reliability of retaining a phone connection due, in part, to the relative simplicity of design. The "wired" network, such as the landline network 5, whether transmitting signals using wires, fiber optics, and high-power wireless transmission, is relatively robust against signalloss, noise, and dropped calls.

Referring again to FIG. 1, mobile phones 12, including those devices having integrated mobile phone functions, are in widespread use for business as well as for personal wireless telecommunications. Mobile phones 12 provide users the freedom of mobility, as they are not coupled to the phone cord 23 of a landline network 5 in order to place or receive a call. Mobile phones 12 transmit and receive a radio-frequency signal using one or more wireless technologies, such as analog cellular, digital PCS, GSM, satellite, and/or other well-known technologies over the mobile phone network 3.

FIG. 3 is a schematic of the mobile phone main functional components (MFMFC) 100 of the mobile phone 12 shown in FIG. 1. The mobile phone 12 shares many of the same basic components as the corded phone 14, such as a keypad 43, a microphone 49, and speaker 48. The phone cord 23, though, is replaced by a transmit/receive antenna 46 and associated components to provide wireless telecommunications.

The MPMFC 100 comprises, generally, a transceiver circuit 104 and a controller circuit 102. The transceiver circuit 104 comprises components for sending and receiving telecommunications, and the controller circuit 102 generally comprises components for operating and managing the functions of the mobile phone 12.

The transceiver section 104 comprises the microphone 49, speaker 48, and signal processing components 51. The microphone 49 detects sound pressure waves 149 and generates an outgoing analog electrical voice signal 249, commonly in the form of instantaneous voltage fluctuations, which is transmitted to an analog-to-digital (A-D) converter 52. The A-D converter 52 converts the outgoing analog electrical voice signal 249 to an outgoing binary electrical voice signal 349. The outgoing binary electrical voice signal 349 is transmitted to a digital signal processor 56, which performs several processing functions on the outgoing binary electrical voice signal 349 to generate an outgoing modulation signal 449. The digital signal processor 56 transmits the outgoing modulation signal 449 to a radio-frequency circuit 58 that produces a transmission signal. 549. The transmission signal 549 is transmitted by way of the antenna 46 over the mobile phone network 3 to a receiving device, such as a terrestrial antenna 20, satellite antenna 26, among others, shown in FIG. 1.

A reception signal 548 is received by the antenna 46 and is transmitted to the radio-frequency circuit 58. The radio-frequency circuit 58 processes the reception signal 548 to produce an incoming modulated signal 448. The incoming modulated signal 448 is transmitted to the digital signal processor 56, which de-modulates the incoming modulated signal 448 into an incoming binary electrical signal 348. The incoming binary electrical signal 348 is transmitted to a digital-to-analog (D-A) converter 54, which converts the incoming binary electrical signal 348 into an incoming analog signal 248 and subsequently transmitted to the speaker 48. The speaker 48 transforms the incoming analog signal 248 into auditable sound pressure waves 148 that can be perceived by the user.

The controller circuit 102 comprises, in general, a keypad 43 having several buttons 44 that enable various operations to be performed, including dialing a phone number, inputting a phone number into an alphanumerical database, and so on. In addition, one of the buttons 44 is provided for initiating a call, often labeled "send," and another button 44 is provided for disconnecting the call, often labeled "off" or "end." An alphanumeric display 42 provides a visual display of the status of the mobile phone 12, including such information as signal strength, remaining battery capacity, the number which has been dialed, and so on.

A microcontroller 59 provides an electrical interface between the alphanumeric display 42 and keypad 43 and various components of the transceiver circuit 104. The microcontroller 59 also provides an electrical interface to the transceiver circuit 104 via the digital signal processor 56, the radio-frequency circuit 58, and/or other components of the MFMFC 100. Instructions executed by the microcontroller 59 co-ordinate MFMFC 100 operations in response to various data, such as the activation of the buttons 44, and signals provided by the MFMFC 100, including, such as, but not limited to, battery strength and signaling information extracted by the digital signal processor 56.

A common and aggravating problem associated with mobile phones 12 is the unexpected loss of signal strength which results in poor sound quality and dropped calls. This loss of signal strength is associated with, among other things, line-of-sight issues wherein terrain and/or obstacles come between the mobile phone 12 and the transmission/receiving antennas 20 of the mobile phone network 3. Loss of signal strength is also associated with the limitations of the mobile phone service coverage by a particular service provider.

Many attempts have been made to improve and overcome poor mobile phone connection issues, including implementation of digital network technologies and associated hardware and software technologies both within the mobile phone 12 and the associated equipment of the mobile phone network 3. Sound quality and frequency of dropped connections have been greatly improved but have yet to reach the quality of the landline network 5 and corded phones 14.

There remains the unanswered need to provide a mechanism in which calls may be immediately interrupted and/or terminated in mid-conversation in a polite and relatively non-offensive way. The need is particularly acute for a society of mobile phone users where "always connected" is a way of life.

SUMMARY OF THE INVENTION

The present invention provides apparatus and methods for interrupting and/or disconnecting a call on a telecommunications device (hereinafter referred to as a "phone") without the interrupter appearing to the interruptee as being rude or offensive. Call disconnection is preceded by characteristic sounds, such as those encountered when a mobile phone is about to drop a call (such sounds hereinafter referred to as "interruption sound"), such as, but not limited to, warning tones indicating a discharged battery, and the characteristic noise, static, and/or distortion of the sound quality that is perceived by the interruptee as poor reception/transmission caused by a weak or weakening signal, going "out-of-range" of the network antenna. In this way, the interruptee will place blame for call disconnection on the mobile-phone technology and not place blame on the interrupter. The same can be used for substantially all telecommunications devices, such as, but not limited to, landline phones, as the interruptee will perceive that the call must have been "call forwarded" to the interruptor's mobile phone.

In accordance with an embodiment of the present invention, the phone and/or phone line is provided with a sound generator circuit comprising a playback circuit and a sound storage circuit including one or more stored interruption sound signals. When call disconnection is desired, the interruptor activates the sound generator circuit by, such as, but not limited to, depressing a button switch thereby triggering the playback circuit to inject a pre-recorded interruption sound signal into the voice signal. The call is subsequently disconnected by the interrupter by hanging up the phone, by a timer circuit hanging up the phone, among others.

In accordance with another embodiment of the present invention, the phone and/or phone line is provided with a synthesizer circuit. When call interruption or disconnection is desired, the interrupter activates the synthesizer circuit to inject synthesized interruption sound signals into the voice signal. Suitable synthesizer circuitry includes, but is not limited to, voltage-controlled oscillator and/or frequency-filtering circuits. The call is subsequently disconnected by the interruptor by hanging up the phone, by a timer circuit hanging up the phone, among others.

In accordance with another embodiment of the present invention, a mobile phone is provided with a signal generator circuit comprising a modulator and/or mixer circuit for frequency translation, frequency changing, and/or heterodyning. A voice signal generated by the microphone is mixed in combination with a modulating signal to produce poor sound quality, such as the sounds associated with loss of signal-strength and/or loss of channel-locking. When call disconnection is desired, the interrupter activates the modulator and/or mixer circuit, such as, but not limited to, by depressing a button switch, triggering the interruption sound signal. The call is subsequently disconnected by the interrupter by hanging up the phone, by a timer circuit hanging up the phone, by the loss of contact with the network due to the degraded transmission signal, among others.

In accordance with another embodiment of the present invention, a transmission antenna of a mobile or wireless phone is provided with an antenna shielding device that blocks and/or degrades the transmitted radio-frequency signal a predetermined amount. Poor sound quality is produced, such as the sounds associated with loss-of-signal strength and/or a dropped call. When call disconnection is desired, the interrupter engages the shielding device that advances the shielding device over at least a portion of the transmission antenna to induce a desired degree of signal strength reduction. The call is subsequently disconnected by the interrupter by hanging up the phone, or by advancing the shielding device over the antenna sufficient to block signal transmission resulting in the call being dropped from the network.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

Specific embodiments of the invention will now be described, by way of example only, with reference to the accompanying drawings, in which:

FIG. 7 is a schematic of a mixer circuit, in accordance with an embodiment of the present invention;

FIG. 8 is a schematic of a switch circuit, in accordance with another embodiment of the present invention;

DETAILED DESCRIPTION OF THE INVENTION

Figure 1:
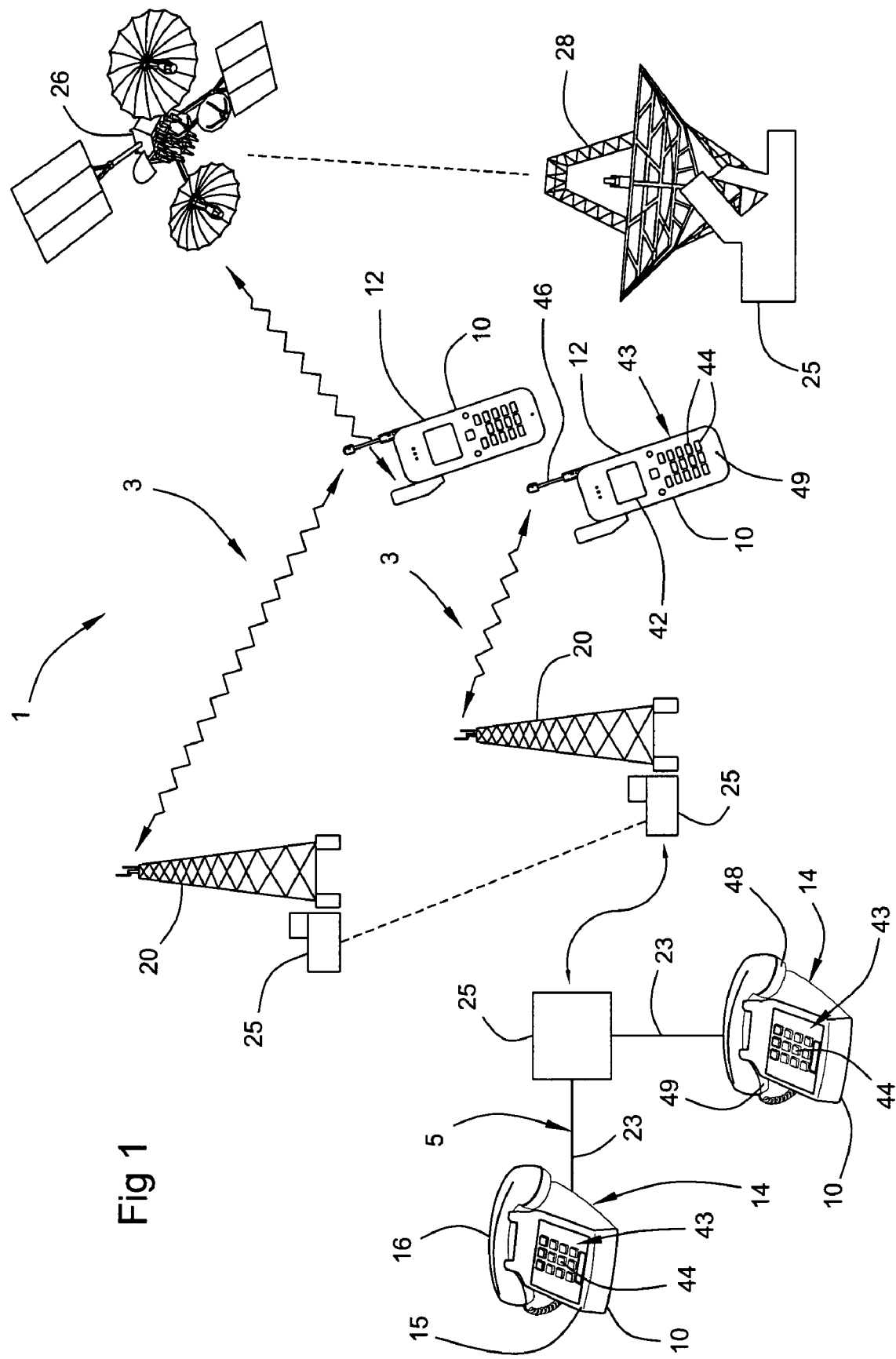
FIG. 1 illustrates a known terrestrial and astral telecommunications system.
Figure 2:
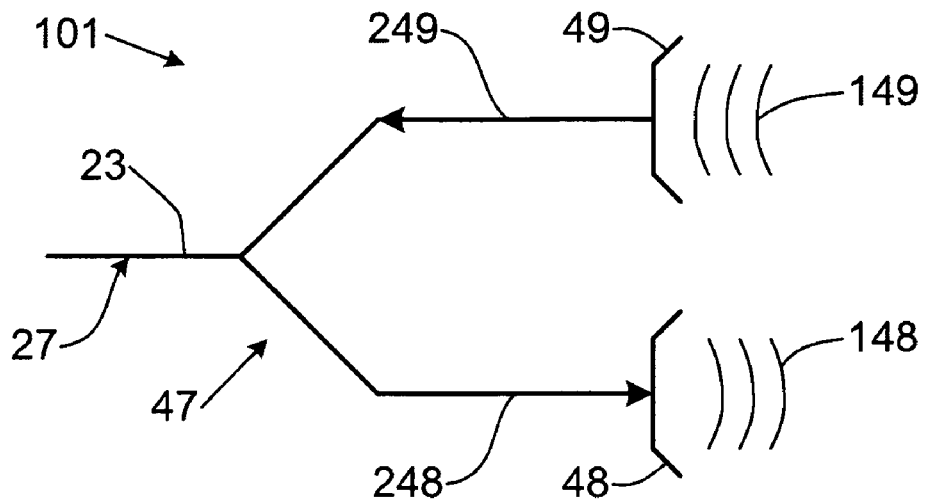
FIG. 2 is a schematic of known corded-phone main functional-components of the corded phone shown in FIG. 1.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The terms "phone" and "telephone" are used herein to refer to any telecommunications device, such as, but not limited to, a landline phone, mobile phone, cordless phone, wireless phone, personal data assistant with phone functions, and other voice and/or data telecommunications devices. The term "landline phone" refers to a phone that is electrically coupled by a wire, such as, but not limited to a phone cord coupled to a telephone jack, to a landline network. The term "call" is used herein as it is understood in the art to refer to an open communications connection between two or more phones, including, but not limited to, electromagnetic radiation streaming through an open radio-frequency channel, electrical signals flowing through an open phone line circuit, and combinations thereof.

"Call disconnection" refers to the disconnection, disconnection, breaking, severing, and/or stopping of the carrier stream of a call wherein the calling parties can no longer communicate without the parties establishing another call. The term "interrupter" refers to a party to a call that interrupts and/or disconnects a call. The "interruptee" refers to a party to an interrupted or disconnected call who is not the interruptor. The term "interruption sound" refers to characteristic sounds, perceived by the interruptee, that hinder or prevent communication between the parties to the call. Interruption sound includes, but is not limited to, those sounds that are associated with events leading up to a mobile phone that is about to drop (disconnect) or has dropped a call. Examples of those sounds include, but are not limited to, characteristic warning tones known to indicate that a mobile phone battery is discharged, and noise, static, and/or distortion of the sound quality associated with, but not limited to, poor reception/transmission caused by a weak transmission signal. "Call interrupting" and "call interruption" refers to deliberate action by an interrupter that subjects a call to an interruption sound and/or interruption sound in combination with call disconnection.

The present invention provides apparatus and methods for interrupting and/or terminating a phone call without the interrupter being perceived by the interruptee as being rude or offensive. The interruptee will place blame for call interruption and/or disconnection, not on the interruptor, but on just another noisy and/or dropped call inherent in mobile-phone technology. The same can be used for substantially all telecommunications devices, including landline phones, as the interruptee will perceive that the call had been "call forwarded" to the interruptor's mobile phone.

Figure 4A:
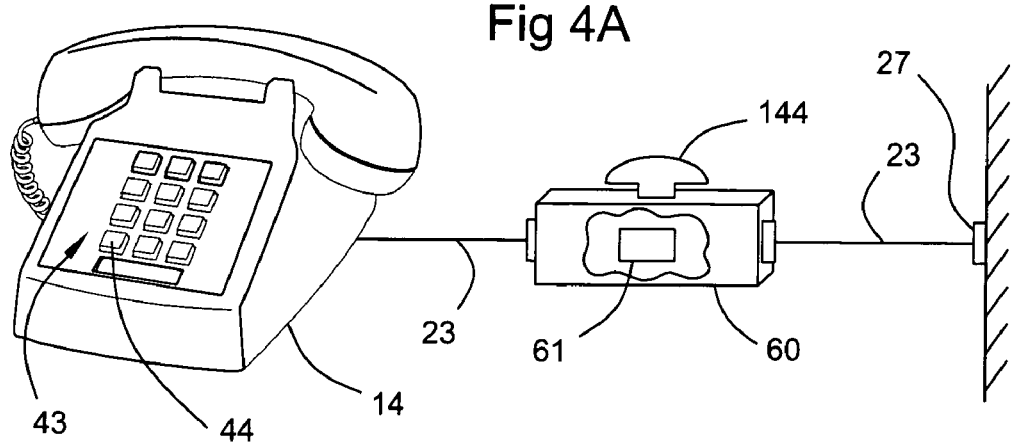
FIG. 4A is a perspective view of a landline phone coupled to a partial cut-away view of an external interruption-sound device, in accordance with an embodiment of the invention.

FIG. 4A is a perspective view of a landline phone 14 coupled to a partial cut-away view of an interruption module 60, in accordance with an embodiment of the invention. The interruption module 60 is electrically coupled between the landline phone 14 and the landline network 27 with phone cords 23. The interruption module 60 comprises an interruption-sound device 61 capable of producing and mixing interruption sound signals into the voice signal to produce a transmission signal that is perceived by the interruptee during a call as interruption sounds, which will be described below. The interruption module 60 further comprises an activation switch 144 for initiating the interruption sound signal. Other apparatus and methods for initiating the interruption sound signal are anticipated, such as, but not limited to, optical switches, voice command, signal command, and activation of one or more buttons 44 on the keypad 43.

Figure 4B:
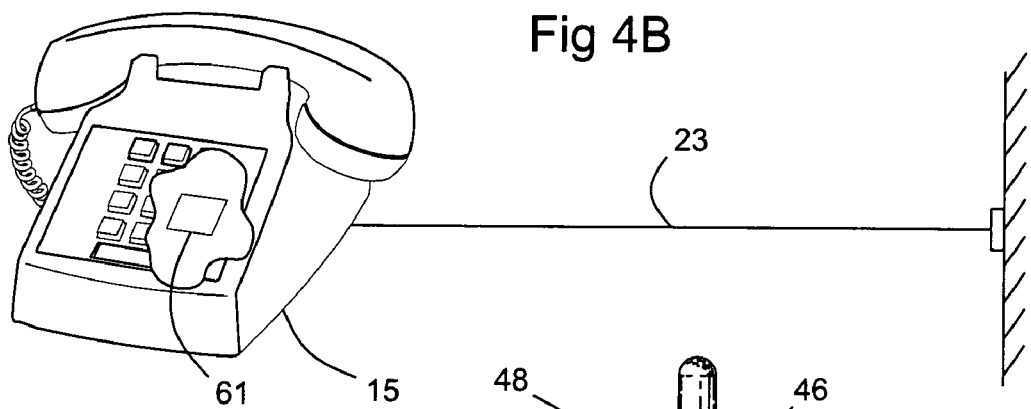
FIG. 4B is a partial cut-away perspective view of a landline phone comprising an internal interruption-sound device, in accordance with an embodiment of the present invention.

FIG. 4B is a partial cut-away perspective view of an interruption-sound device-equipped (ISDE) landline phone 15 comprising an internal interruption-sound device 61, in accordance with an embodiment of the present invention. The internal interruption-sound device 61 is electrically coupled to the internal circuitry (not shown) of the ISDE landline phone 15 and is capable of producing and mixing interruption sound signals into the voice signal to produce a transmission signal that is perceived by the interruptee during a call as interruption sounds. Call interruption and/or disconnection is activated as described below.

Figure 4C:
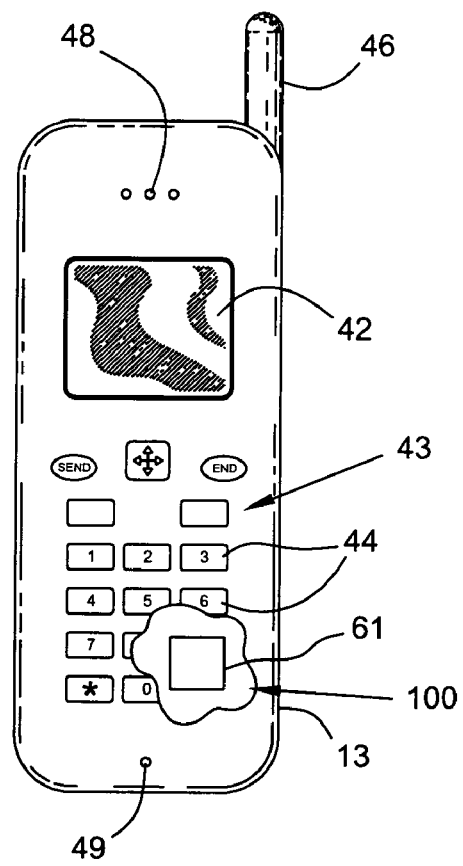
FIG. 4C is a partial cut-away perspective view of a mobile phone comprising an internal interruption-sound device, in accordance with an embodiment of the present invention.

FIG. 4C is a partial cut-away perspective view of a mobile phone 13 comprising an internal interruption-sound device 61, in accordance with an embodiment of the present invention. The internal interruption-sound device 61 is electrically coupled to the internal circuitry (not shown) of the mobile phone 13 and is capable of producing and mixing interruption sound signals into the voice signal to produce a transmission signal that is perceived by the interruptee during a call as interruption sounds. Call interruption and/or disconnection is activated as described below.

Figure 5:
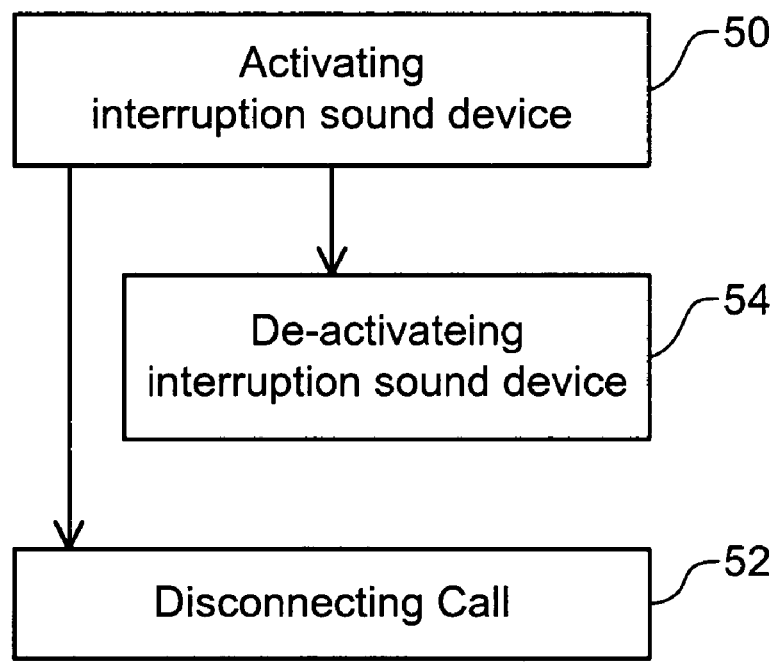
FIG. 5 is a flow diagram of call interruption and/or disconnection in accordance with embodiments of methods of the present invention.

FIG. 5 is a flow diagram of call disruption and/or disconnection in accordance with embodiments of methods of the present invention. In one embodiment in accordance with the present invention, the interruptor activates the interruption-sound device 50 during a call, thereby causing the interruptee to hear interruption sounds. After a period of time, the call is automatically disconnected or manually disconnected by the interruptor 52. In accordance with another method of the present invention, the interruptor activates the interruption-sound device 50, and subsequently deactivates the interruption-sound device 54 to resume the call without disconnection.

Referring again to FIGS. 4A–C, the interruptor controls the call using one or more methods. In one embodiment, the call can be manually terminated after the interruption-sound device 61 is activated in any number of ways, such as, but not limited to, depressing the switch hook or "end" button after the interruption-sound device 61 is activated, and/or depressing a dedicated or multi-functional button or switch adapted for terminating the call. In another embodiment, the call is automatically terminated at a predetermined time after the interruption-sound device 61 is activated, wherein call disconnection is controlled by a timer circuit, among others, as will be described below.

In accordance with another method of the present invention, the interrupter follows the actuation of the interruption-sound device 61, such as, by actuating the button 44 with deactivation of the interruption-sound device 61, such as, by actuating the button 44 a second time. In accordance with another method of the present invention, the interrupter activates the call interruption-sound device 61 thereby causing the interruptee to hear interruption sounds for a predetermined period of time, followed by automatic call disconnection.

Several ways to produce interruption sounds are anticipated, some of which are included below by way of example. Various embodiments include the use of stored or created sound signals, and other embodiments include mechanical signal degradation using mechanical-electrical interference. Embodiments of apparatus and methods for mixing the interruption sound signals into the transmission signal so as to be perceived by the interruptee as interruption sounds are also anticipated, examples of which are included below.

Figure 6:
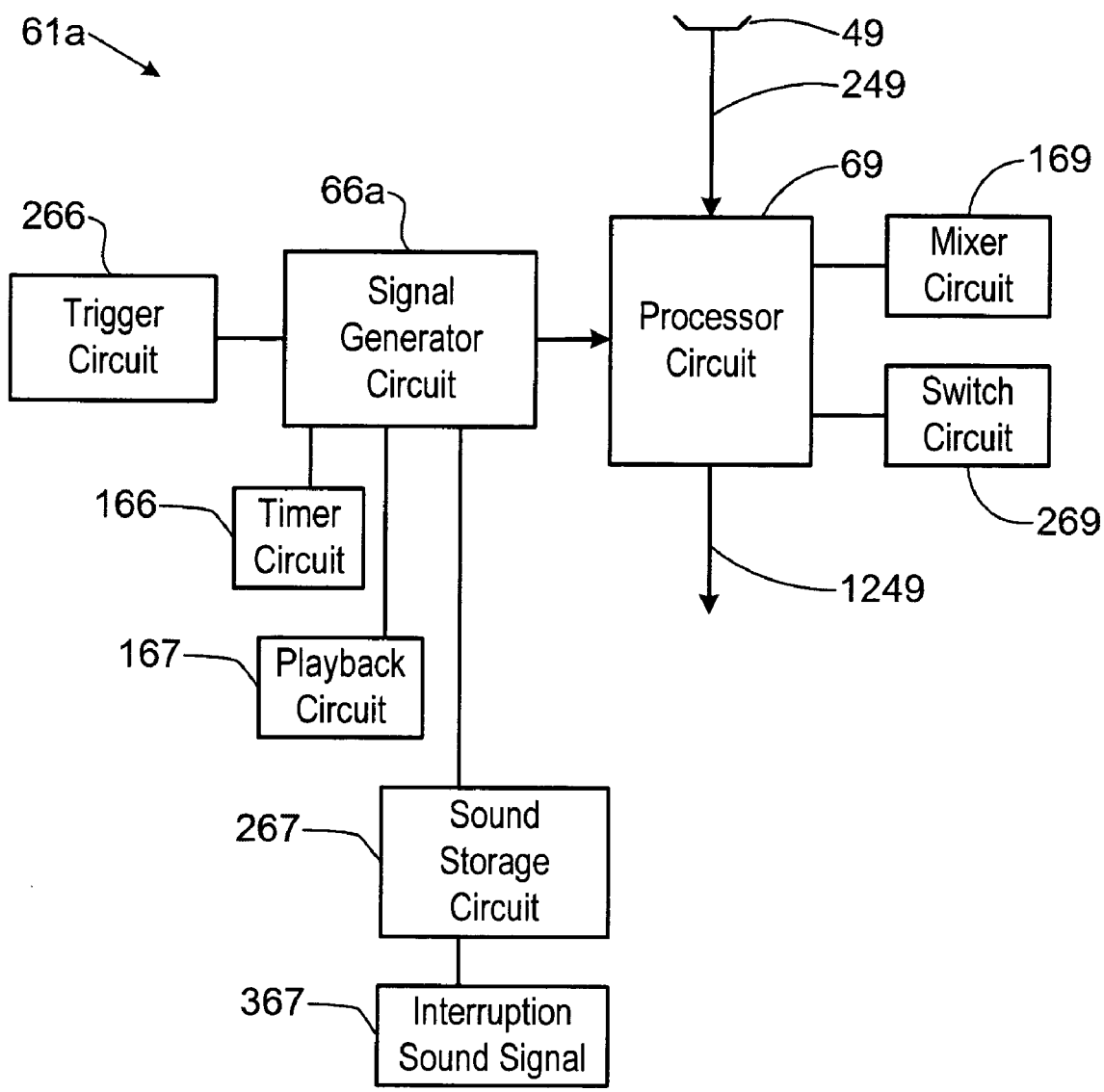
FIG. 6 is a schematic of an interruption-sound device, in accordance with an embodiment of the present invention.

FIG. 6 is a schematic of embodiments of interruption-sound devices 61a for producing an interruption sound signal in a telecommunications transmission signal comprising a signal generator circuit 66a and a processor circuit 69, in accordance with the present invention. The signal generator circuit 66a comprises a playback circuit 167 and a sound storage circuit 267. The sound storage circuit 267 is adapted to store one or more interruption-sound signals 367.

In one embodiment of the signal generator circuit 66a, the sound storage circuit 267 is suitable for storing a pulse-code-modulation (PCM) sound signal. Pulse-code-modulation is a known technology for recording and storing recorded sounds for later playback.

In one embodiment, the processor circuit 69 comprises a mixer circuit 169. The mixer circuit 169 is adapted to combine two or more signals into a single signal. The processor circuit 69 is adapted to process the interruption-sound signals 367 in combination with a voice signal 249 generated by a microphone 49 to produce a transmission signal 1249 including the interruption-sound signal. The interruptee will receive the transmission signal 1249 and perceive the interruption-sound signal 367 as interruption sound.

In another embodiment, the processor circuit 69 comprises a switch circuit 269. The switch circuit 269 is adapted to switch between two or more signals. The processor circuit 69 is adapted to process the interruption-sound signals 367 or the voice signal 249 generated by a microphone 49 to produce a transmission signal 1249 including either the interruption-sound signal 367 or the voice signal 249. The interruptee will receive the transmission signal 1249 and perceive either the interruption-sound signal 367 as interruption sound or the voice signal 249.

When call interruption is desired, the interrupter activates the signal generator circuit 66a. In one embodiment, a trigger circuit 266a is adapted to activate or activate and deactivate the signal generator circuit 66a. The signal generator circuit 66a activates the playback circuit 167 to "play" one or more of the stored interruption-sound signals 367 that is subsequently mixed with the voice signal 249 by the processor circuit 69 to be transmitted to the interruptee. In one embodiment, wherein the stored interruption-sound signal 367 is an analog signal, the analog signal is transmitted to the processor circuit 69 to incorporate the analog signal into the voice signal 249. In another embodiment, wherein the stored interruption-sound signal 367 is a digital signal, the digital signal is fed into an appropriate circuit, such as the digital-to-analog (D-A) converter, to convert the digital signal into an analog signal for mixing with the voice signal 249 into the transmission signal 1249.

In an embodiment in accordance with the present invention, call disconnection is effected by the interrupter after a desired period of time of transmitting the interruption-sound signal by hanging up the phone, such as, but not limited to, selecting the "end," "off," or similar button provided on the mobile phone 13 or by depressing the switch-hook of a landline phone.

In other embodiments in accordance with the present invention, the signal generator circuit 66a comprises a timer circuit 166 adapted to disconnect the call automatically after a predetermined length of time of playback of the interruption-sound signal 367 following activation by the interrupter. In an embodiment, the interrupter controls the predetermined period of time. For example, but not limited thereto, the processor circuit 69 detects the activation of a specific button 44 on the keypad 43 of the phone 13. The processor circuit 69 responds by activating the signal generator circuit 66a. The length of time in which the interruption sound signal 71 will be transmitted is determined by the specific button 44 pressed on the keypad 43. For example, activation of the number 5 button triggers the processor circuit 69 to trigger the signal generator circuit 66a to produce the interruption sound signal 71 for five seconds prior to automatic call disconnection. The signal generator circuit 66a can be turned off after activation to abort call disconnection.

In yet another embodiment in accordance with the present invention, automatic call disconnection is aborted by the interrupter with a second activation of the signal generator circuit 66a.

FIG. 7 is a schematic of a mixer circuit 69 suitable for mixing two signals of differing types, in accordance with an embodiment of the present invention. The mixer circuit 69 comprises a .mu.-law/linear converter circuit 31, a summation circuit 32, and a linear/.mu.-law converter circuit 33. The mixer circuit 69 allows for the mixing of interruption sound signals 367 with voice signals 249 so that the voice of the terminating party can be heard along with interruption sound. In an embodiment in accordance with the present invention, a linear-coded stored interruption sound signal 367 is added to, mixed, or summed together with, a digital-coded voice signal 249, which requires that the digital-coded voice signal 249 be converted into a linear-coded voice signal prior to summing.

The stored interruption-sound signal 367 is processed and/or produced as a linear interruption-sound signal 132 that is input to a summing circuit 32. Also input to the summing circuit 32 is the digital voice signal 249 from the user. The digital voice signal 249 is processed into a linear voice signal 130 buy a known device. One such device is the .mu.-law/linear converter circuit 31, which is suitable for processing a digital voice signal 30 that is digitized in mu.-law coded form. The .mu.-law/linear converter circuit 31 converts the digital voice signal 249 to a linear voice signal 130.

The linear interruption-sound signal 132 is then mixed with the linear voice signal 130 in effect, adding the linear interruption sound signal 132 to the linear voice signal 130. The resultant summed signal 230 is linear-coded and is subsequently converted to a .mu.-law-coded digital transmission signal 1249 by a linear/.mu.-law converter circuit 33. The digital summed signal 330 is then transmitted by the antenna 46 and received by the other party, who perceives a mix of voice and interruption sound.

FIG. 8 is a schematic of a switch circuit 269, in accordance with an embodiment of the present invention. The switch circuit 269 comprises a switch 34 controlled by the processor circuit 69, shown in FIG. 6. The switch 34 allows the transmission of either the voice signal 249 or the interruption-sound signal 367, but not both. The switch circuit 269 provides the ability to switch between the voice signal 249 and the interruption sound signal 367, by a switch 34 controlled by the processor circuit 69 initiated by the interrupter. In this embodiment, voice signal 249 and interruption sound signal 367 are not transmitted to the terminated party simultaneously. Therefore, mixer circuits and the like are not needed.

In accordance with embodiments of the present invention, the interruption-sound device 61a is suitable to be incorporated into the external interruption module 60 as shown in FIG. 4A, the ISDE landline phone 15 as shown in FIG. 4B, and the mobile phone 13 as shown in FIG. 4C.

Figure 3:
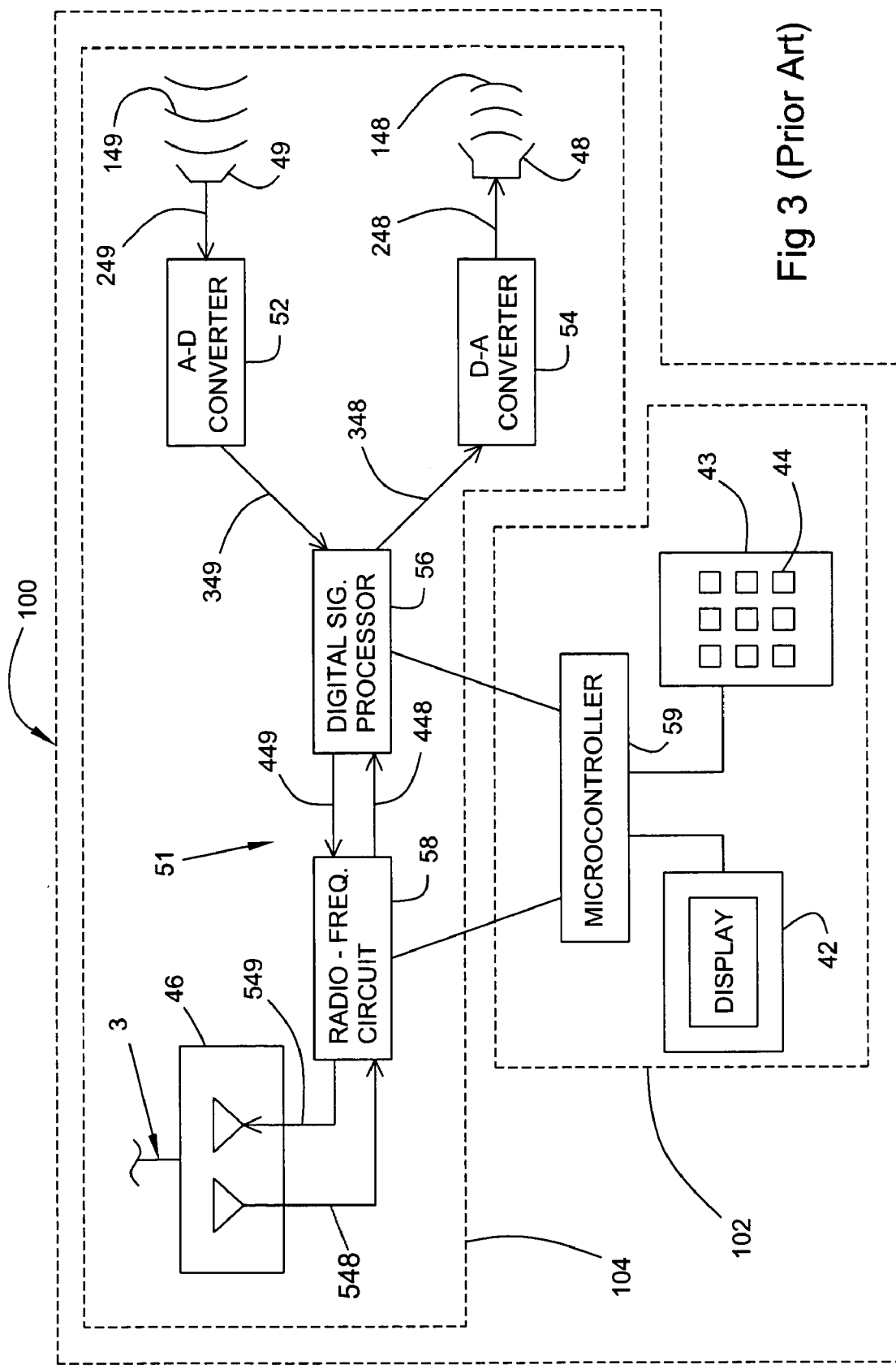
FIG. 3 is a schematic of known mobile phone main functional components of the mobile phone shown in FIG. 1.

Referring again to FIGS. 3 and 4C, it is understood that there are many locations within or about the mobile phone main functional components (MFMFC) 100 found in most all mobile phones 13 to interconnect an interruption-sound device 61 in accordance with embodiments of the present invention. Example locations include, but are not limited to, the digital signal processor 56 and the radio-frequency circuit 58 associated with the transceiver circuit 104.

Figure 9:
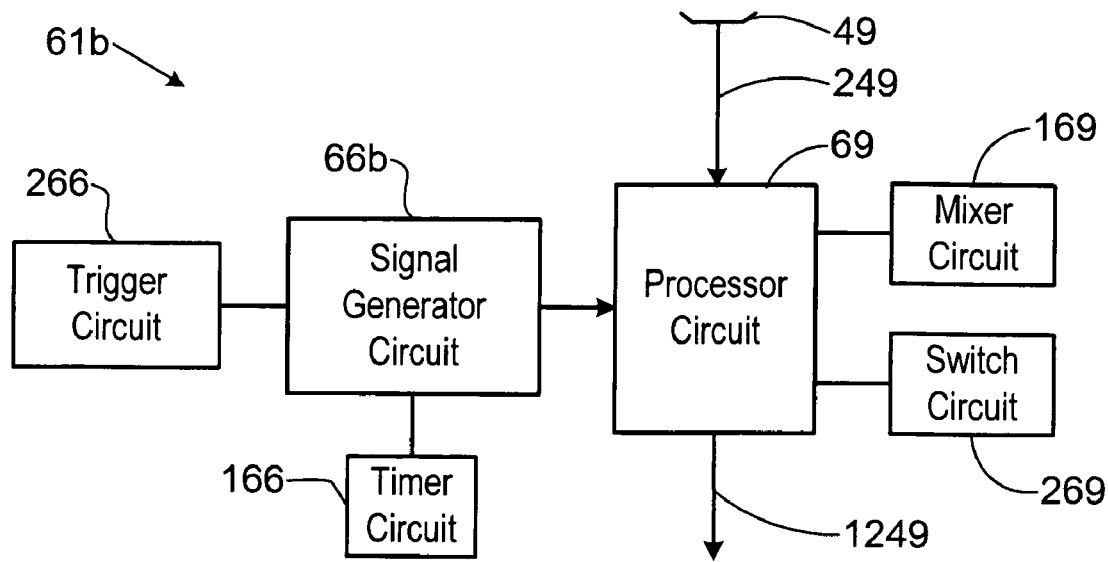
FIG. 9 is a schematic of a synthesizer-based interruption-sound device, in accordance with an embodiment of the present invention.

FIG. 9 is a schematic of a synthesizer-based interruption-sound device 61b comprising a synthesizer signal generator circuit 66b, in accordance with an embodiment of the present invention. Examples of suitable synthesizer signal generator circuits 66b, include, but are not limited to, voltage-controlled oscillator circuits and frequency-filtering circuits, and combinations thereof, are suitable for the particular purpose. Voltage-controlled oscillator circuits and frequency-filtering circuits are capable of generating synthesized sound signals, such as white noise to simulate static and the like. Voltage-controlled oscillator circuits and frequency-filtering circuits are known in the synthesized musical instrument arts. The synthesized sound signals are input into the appropriate location of the telecommunications device, such that the interruptee perceives the interruption sound.

The synthesizer-based interruption-sound device 61b is suitable to be incorporated into the external interruption module 60 as shown in FIG. 4A, the ISDE landline phone 15 as shown in FIG. 4B, and the mobile phone 13 as shown in FIG. 4C. The synthesizer-based interruption-sound device 61b is suitable for use in substantially the same way as the interruption-sound devices 61a described above, including, but not limited to, with a timer circuit 166 for automatic call disconnection, a mixer circuit 169, and a switch circuit 269.

Figure 10:
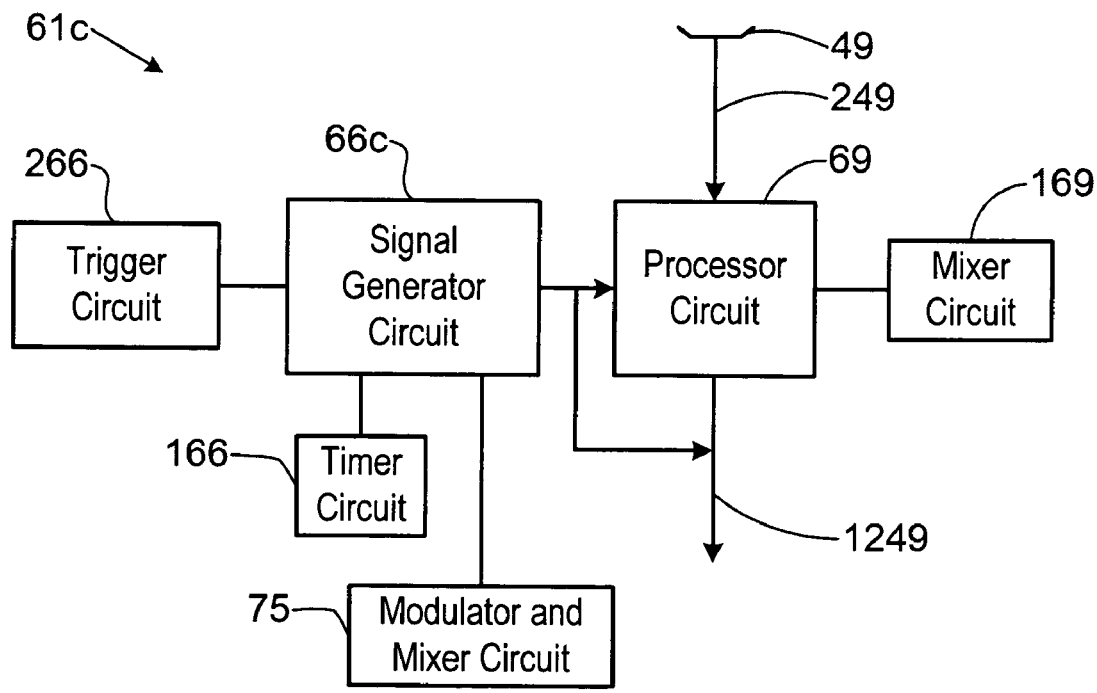
FIG. 10 is a schematic of a frequency altering interruption-sound device, in accordance with an embodiment of the present invention.

FIG. 10 is a schematic of a frequency altering interruption-sound device 61c, comprising a modulator and mixer circuit 75 for frequency translation, frequency changing, and/or heterodyning, which acts upon the voice signal 249 generated by the microphone 49, in accordance with another embodiment of the present invention. The modulator and mixer circuit 75 is provided for use with particular mobile phones 13 that provide the necessary circuitry in which the modulator and mixer circuit 75 can interact. Such circuitry is not commonly associated with landline phones, for example.

The voice signal 249 is modulated in a number of ways, such as, but not limited to, by summing the voice signal 249 in combination with a modulating signal to produce interruption sound signal using a mixer circuit 169 as described above. One characteristic sound that can be produced in this embodiment includes, but is not limited to, sound associated with loss of channel locking. This loss of channel locking sound is produced because the use of this embodiment causes a loss of channel locking to occur.

In an embodiment in accordance with the present invention, wherein the mobile phone 13 comprises a multiple radio frequency channel system, in which each channel has an associated channel frequency and the channel frequencies of adjacent channels are separated by a channel spacing, the voice-modulation signal is processed in combination with one or more analog modulating signals to produce a radio-frequency output signal at least partially out of a channel frequency of the multiple channel radio system. The frequency of the one or more analog modulating signals is adjusted in accordance with their respective frequency resolutions so as to change and detune the channel frequency of the output signal to produce poor sound quality associated with loss-of-signal strength and/or loss of channel locking.

In accordance with an embodiment of the invention, the frequency altering interruption-sound device 61c comprises a radio-frequency phase-locked-loop synthesizer 77. The phase-locked-loop synthesizer 77 and methods of this embodiment is provided for use with particular mobile phones 13 that provide the necessary circuitry in which the phase-locked-loop synthesizer 77 can interact. Such circuitry not associated with landline phones, for example.

Figure 11:
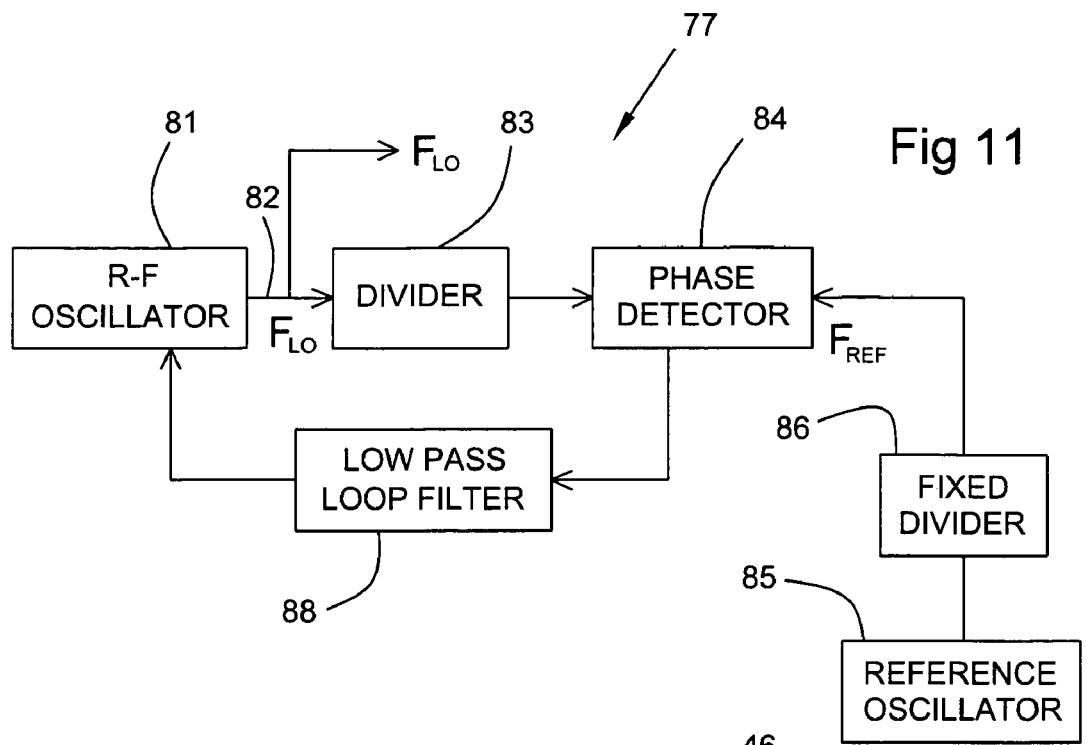
FIG. 11 is a schematic of a phase-locked-loop frequency synthesizer, in accordance with an embodiment of the present invention.

FIG. 11 is a schematic of a known radio-frequency phase-locked-loop synthesizer 77 comprising a radio-frequency oscillator 81 having a tuned circuit having a resonant frequency defined, such as, but not limited to, by a varicap diode and an inductor, in accordance with an embodiment of the present invention. The oscillator 81 is known, such as, but not limited to, a Hartley or Colpitts oscillator. The oscillator 81 produces an oscillator output 82 having a frequency F.sub.LO defined by the resonant frequency of the tuned circuit.

The oscillator output 82 is supplied to a divider 83, which divides the oscillator frequency, F.sub.LO, by an integer value, n. The divided frequency is supplied to a first input of a phase detector 84.

A reference oscillator 85, such as, but not limited to, a temperature-compensated crystal oscillator, oscillates at a fixed known frequency. The output of the reference oscillator 85 is divided by a fixed factor in a fixed divider 86. The output from the fixed divider 86, the reference frequency, F.sub.REF, is supplied to a second input of the phase detector 84.

The phase detector 84 generates an output voltage dependent on the difference in phase between the signal at the first input and the second input. The output voltage is supplied to a low-pass loop filter 88, which, in turn, supplies a control voltage to the oscillator 81, such as, but not limited to, a vericap diode within the oscillator 81. The loop filter 88 generates a signal that pulls the phase and frequency F.sub.LO of the oscillator 81 to a value, which after division by n in the variable divider 83, is equal to the phase and frequency of F.sub.REF, from the fixed divider 86.

A characteristic problem with the phase-locked loop synthesizer 77 is feed-through of the F.sub.REF signal from the fixed divider 86, through the phase detector 84, to the signal supplied to the oscillator 81. An effect of this feed-through is instability in the phase-locked loop synthesizer 77. Removal of F.sub.REF from the output of the phase detector 84, and hence any instability in the phase-locked loop synthesizer 77, is performed by the loop filter 88. However, as the loop filter 88 is a low-pass filter, its effect is to dampen changes or hops in the frequency F.sub.LO which occur as a result of changes in integer n.

Without extreme filtering, due to radio frequency feed-through, sideband frequencies are imposed on the oscillator output 82 from oscillator 81, which has a corresponding center frequency. These sideband frequencies will degrade or distort reception of the desired channel by adding modulation components. In accordance with an embodiment of the present invention, this phenomenon is exploited to create interruption sound and to an extreme, cause the call to be dropped.

In accordance with another embodiment of the present invention, the interruption sound can be produced by, but not limited to, removing, changing, and/or modulating the loop filter 88.

The frequency altering interruption-sound device 61c is suitable for use with a timer circuit 166 for automatic call disconnection as described above.

Figure 12:
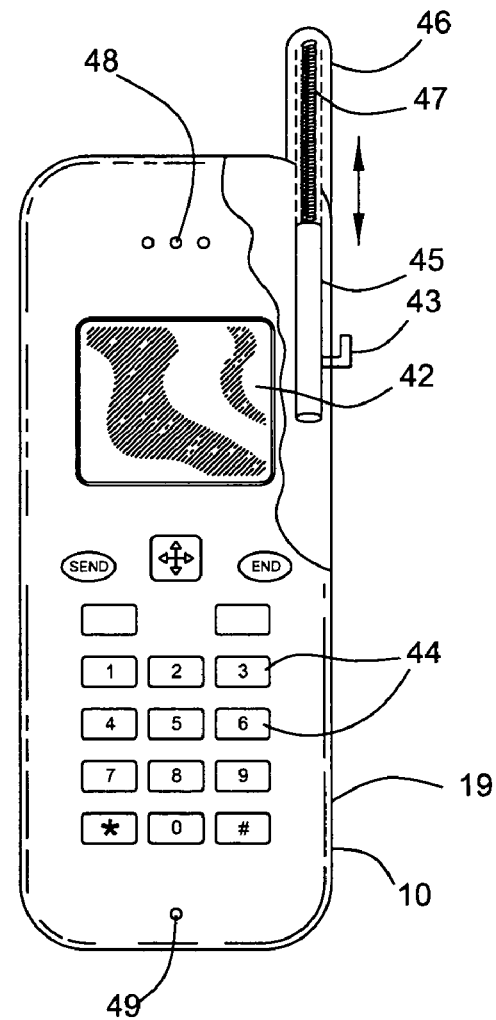
FIG. 12 is a front cut-away view of a mobile phone comprising an antenna and an antenna shielding device, in accordance with an embodiment of the present invention.

FIG. 12 is a front cut-away view of a mobile phone 19 comprising an antenna 46 and an antenna shielding device 45, in accordance with another embodiment of the present invention. This embodiment is suitable for phones having an antenna 46, such as mobile phones and cordless phones. The antenna 46 comprises an active element 47. The active element 47 is used herein in the general sense at to mean the element of the antenna 46 that transmits and/or receives the transmitted radio frequency signal. It is generally known that the active element can take on many configurations, such as that of a straight or coiled wire, among others. The antenna shielding device 45 is adapted to translate to cover at least a portion of the active element 47. In an embodiment in accordance with the present invention, the antenna shielding device 45 comprises a handle 43 used to facilitate the translation of the antenna shielding device 45 over or away from the active element 47.

The antenna shielding device 45 is adapted to block or degrade the transmitted radio-frequency signal a predetermined amount to induce interruption sounds and/or a dropped call. When call interruption is desired, the interruptor engages and advances the shielding device 45 over at least a portion of the active element 47 to induce a desired degree of blocking to reduce signal strength. Call disconnection is produced, such as, but not limited to, by advancing the shielding device 45 over the active element 47 sufficient to block signal transmission, which results in the call being dropped.

In another embodiment in accordance with the present invention, call disconnection is effected by the interrupter after a desired time of transmitting a reduced strength signal by selecting the "end," "off," or similar means in which the mobile phone is provided for call disconnection.

In yet another embodiment in accordance with the present invention, the interfering sounds are aborted by the interruptor removing the antenna-shielding device 45 away from the active element 47, restoring signal strength.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed:

1. An interruption-sound device for producing an interruption-sound signal in a telecommunications transmission signal, the apparatus comprising:
   a signal generating circuit for producing an interruption-sound signal; and
   a processing circuit for processing the interruption-sound signal in combination with a voice signal generated by a microphone to produce a transmission signal including the interruption-sound signal, wherein the signal generating circuit comprises a radio-frequency phase-locked-loop synthesizer adapted to produce sideband frequencies to degrade or distort reception of a desired channel by adding modulation components to create interruption sound and to cause the transmission signal to be dropped.

* * * * *